United States Patent [19]

Morgan et al.

[11] Patent Number: 5,642,490
[45] Date of Patent: Jun. 24, 1997

[54] PROVIDING ICON PLACEMENT ALTERNATIVES FOR DYNAMICALLY ADDED CONTAINER RECORDS

[75] Inventors: Scott Anthony Morgan, Travis County; Karl David Johnson, Williamson County; Judith Holbrook Lewis, Tavis County, all of Tex.

[73] Assignee: International Business Machines Corporation, Armonk, N.Y.

[21] Appl. No.: 265,838

[22] Filed: Jun. 24, 1994

[51] Int. Cl.$^6$ ............................................. G06F 3/14
[52] U.S. Cl. ..................... 395/342; 395/348; 395/339
[58] Field of Search ........................... 395/159, 155, 395/157, 161, 160, 700, 342, 348, 334, 333, 339, 347

[56] References Cited

U.S. PATENT DOCUMENTS

| | | | |
|---|---|---|---|
| 5,060,170 | 10/1991 | Bourgeois et al. | 395/157 |
| 5,072,412 | 12/1991 | Henderson, Jr. et al. | 395/159 |
| 5,371,847 | 12/1994 | Hargrove | 395/157 |
| 5,377,317 | 12/1994 | Bates et al. | 395/157 |
| 5,390,295 | 2/1995 | Bates et al. | 395/157 |

OTHER PUBLICATIONS

European Search Report, dtd Sep. 29, 1995.
"Free-Space Search for Best-Fit Placement of New Desktop Object", IBM Technical Disclosure Bulletin, V37 N01, Jan. 1994, pp. 455–456.
"Simulating the Workplace Shell Fanning of Container Records", IBM Technical Disclosure Bulleting, V37 N04B, Apr. 1994, pp. 309–310.
"OS/2 2.0 Presentation Manager Programming Guide", 1992, Chapter 18.
Microsoft Windows User's Guide for the Windows Graphical Environment, version 3.0, Microsoft Corporation, 1985–1990, pp. 55–56, 84–86.
Microsoft Windows User's Guide for the Microsoft Windows Operating System, Microsoft Corporation, 1990–1992, pp;. 34, 44–45.

*Primary Examiner*—Raymond J. Bayerl
*Assistant Examiner*—Crescelle N. dela Torre
*Attorney, Agent, or Firm*—Whitham, Curtis, Whitham & McGinn; Jeffrey S. LaBaw, Esq.

[57] ABSTRACT

An application programmer may choose from several alternative different methods for placing dynamically added icons in a graphical user interface (GUI) environment. The application program can pick the appropriate method depending on the situation, which often may involve reacting to a particular user action. The method is implemented in a graphical user interface environment on a computer. The application program selects one of the alternative choices for the placement of dynamically added icons. The selection by the application program is based on particular circumstances as determined by an application programmer of the application program. The dynamically added icon is placed on the display screen according to a procedure corresponding to a selected one of the alternate choices. The dynamically added icons may represent containers holding objects, such as executable programs, database records, graphic images, word processing files, or another container which itself can hold objects.

16 Claims, 13 Drawing Sheets

PROVIDING ICON PLACEMENT ALTERNATIVES FOR DYNAMICALLY ADDED CONTAINER RECORDS

BACKGROUND OF THE INVENTION

1. Field of the Invention

The present invention generally relates to graphic user interfaces (GUIs) for computer programs and, more particularly, to a system for dynamically adding icons to the display screen by an application program in the course of running the application program.

2. Description of the Prior Art

Personal computer (PC) and workstation operating systems (OS) implement a graphical user interface (GUI) which provides an intuitive way to access functions of the operating system. The graphical user interface minimizes keyboard input by a user providing instead input by pointing, typically by means of a mouse controlled cursor. An icon displayed on the screen of the PC or workstation display might represent, for example, an application program, and by placing the cursor over the icon and double clicking the mouse button, the user will cause the program to be loaded. An icon might also represent a file used by an application program, and by placing the cursor over that icon and clicking the mouse button once, the file is selected or opened for use by the program. It is also possible to move files from one directory to another by a "drag-and-drop" operation. This is accomplished by first selecting the icon representing the file and, while maintaining the mouse button depressed, moving the cursor and the icon across the screen to the desired location and then releasing the mouse button.

Examples of operating systems with such a graphical user interface include X-Windows and Motif for the Unix operating system, the System 7 operating system for the Apple Macintosh computer, Microsoft's Windows, and Presentation Manager (PM) for International Business Machines (IBM) Corporation's OS/2 operating system. These are all window-orientated graphical user interfaces which display one or more windows on the screen of the PC or workstation within which various icons may be displayed. For the purposes of this disclosure, IBM's OS/2 operating system is specifically addressed, but it will be understood by those skilled in the art that the principles of the invention can be applied to other GUI operating systems.

The OS/2 container control is one of the most used and most powerful controls available in the Presentation Manager (PM) control set. It is a visual component whose specific purpose is to hold objects. These objects might represent such diverse entities as executable programs, database records, graphic images, or word processing files. The objects in a container may be visually represented by icons, bitmaps, text strings, or various combinations thereof. The view of the container determines what types of combinations are possible.

The icon view, one of the most often used of the five container view types, uses icons or bitmaps with text strings beneath to represent the objects in the container. When a container is initially displayed in the icon view, all records are generally fanned out so that no records will overlap. This is implemented by sending the PM CM_ARRANGE message to the container before it is displayed. This message displays records in the container by filling the topmost row until the width of the client area is reached. The container records then wrap to form another row immediately below the filled row. The process is repeated until all of the container records are positioned in rows. For more information on the Presentation Manager of OS/2, the reader is referred to *OS/2 2.0 Technical Library Presentation Manager Programming Reference Version 2.0*, Volumes I, II and III (1992), IBM Publications Numbers: Volume I—S10G-6264-00; Volume II—S10G6265-00; Volume III—S10G-6272-00.

The problem that the subject invention addresses concerns the placement of records that are dynamically added to an icon view container after it is displayed. These are not records that are added via a user initiated drag/drop operation, but rather records that are dynamically added to the display screen by the application program during the course of running the program and may or may not be in response to some user action.

SUMMARY OF THE INVENTION

It is therefore an object of the present invention to provide a procedure for the dynamic placement of icons in a graphic user interface.

According to invention, a number of different options are provided that may be utilized by an application programmer. These options provide great flexibility to the programmer by providing a number of reasonable solutions to the problem. The most appropriate solution for a particular situation can then be selected.

More particularly, the method according to the invention is implemented in a graphical user interface environment on a computer. The application program selects one of the alternative choices for the placement of dynamically added icons. The selection by the application program is based on particular circumstances as determined by an application programmer of the application program. The dynamically added icon is placed on the display screen according to a procedure corresponding to a selected one of the alternate choices. In the preferred embodiment, the dynamically added icons can represent objects, such as executable programs, database records, graphic images, word processing files or another container which itself can hold objects. The action of dynamically adding icons to the display screen by the application program may result from reacting to a particular user action, but may simply result from the running of the application program without any particular user input.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
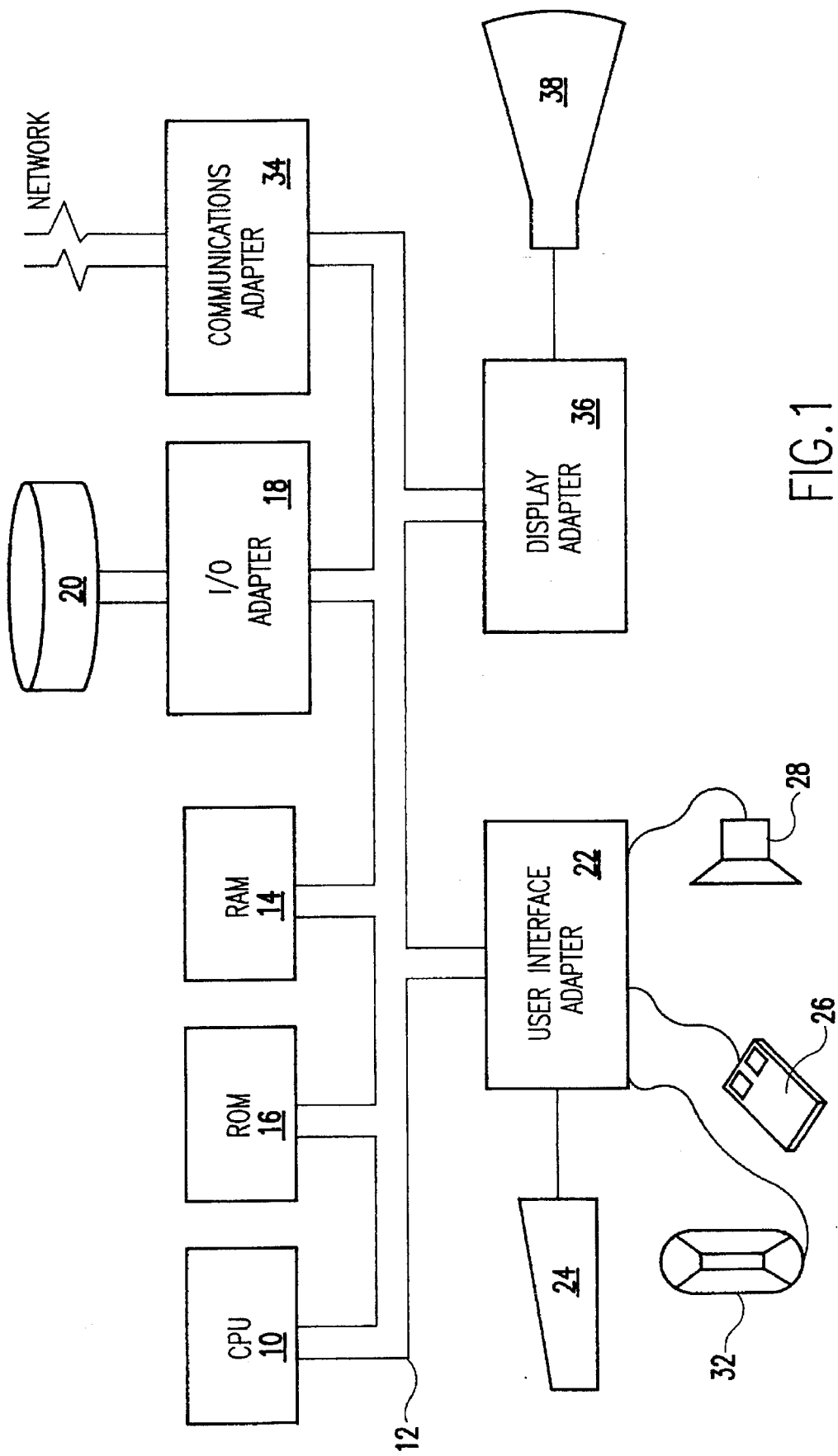
FIG. 1 is a block diagram showing a hardware configuration on which the subject invention may be implemented.

Referring now to the drawings, and more particularly to FIG. 1, there is shown a representative hardware environment on which the subject invention may be implemented. This hardware environment may be a personal computer such as the International Business Machines (IBM) Corporation's PS/2 Personal Computers or a workstation such as IBM's RS/6000 Workstations. The hardware includes a central processing unit (CPU) 10, which may be a complex instruction set computer (CISC) microprocessor such as the Intel 386, 486 or Pentium microprocessors or a reduced instruction set computer (RISC) microprocessor such as IBM's PowerPC microprocessor. The CPU 10 is attached to a system bus 12 to which are attached a random access memory (RAM) 14, a read only memory (ROM) 16, an input/output (I/O) adapter 18, and a user interface adapter 22. The RAM 14 provides temporary storage for application program code and date, while ROM 16 typically includes the basic input/output system (BIOS) code. The I/O adapter 18 is connected to one or more Direct Access Storage Devices (DASDs), here represented as a disk drive 20. The disk drive 20 typically stores the computer's operating system (OS) and various application programs, each of which are selectively loaded into RAM 14 via the system bus 12. The I/O adapter 18 may support, for example, the Integrated Device Electronics (IDE) interface standard or the SCSI interface standard. In the former case, the I/O adapter 18 typically will support two disk drives in parallel, designated as drives "C:" and "D:". In the latter case, the I/O adapter 18 will support up to nine disk drives connected in a daisy chain. The user interface adapter 22 has attached to it a keyboard 24, a mouse 26, a speaker 28, a microphone 32, and/or other user interface devices such as a touch screen device (not shown). Such touch screen device would optionally be installed on the display 38, here represented as a cathode ray tube (CRT) display but which may be a liquid crystal display (LCD). The display 38 is connected to the system bus 12 via a display adapter 34. Optionally, a communications adapter 34 is connected to the bus 12 and to a network, such as a local area network (LAN), such as IBM's Token Ring LAN. Alternatively, the communications adapter may be a modem connecting the personal computer or workstation to a telephone line as part of a wide area network (WAN).

In a preferred embodiment of the invention, the tools of IBM's OS/2 operating system, and in particular the Presentation Manager (PM), are used. Five different procedures are presented as possible alternatives for positioning dynamically added icons which represent container records. The five alternatives, along with outlines of their procedures, are described below.

Figure 2A:
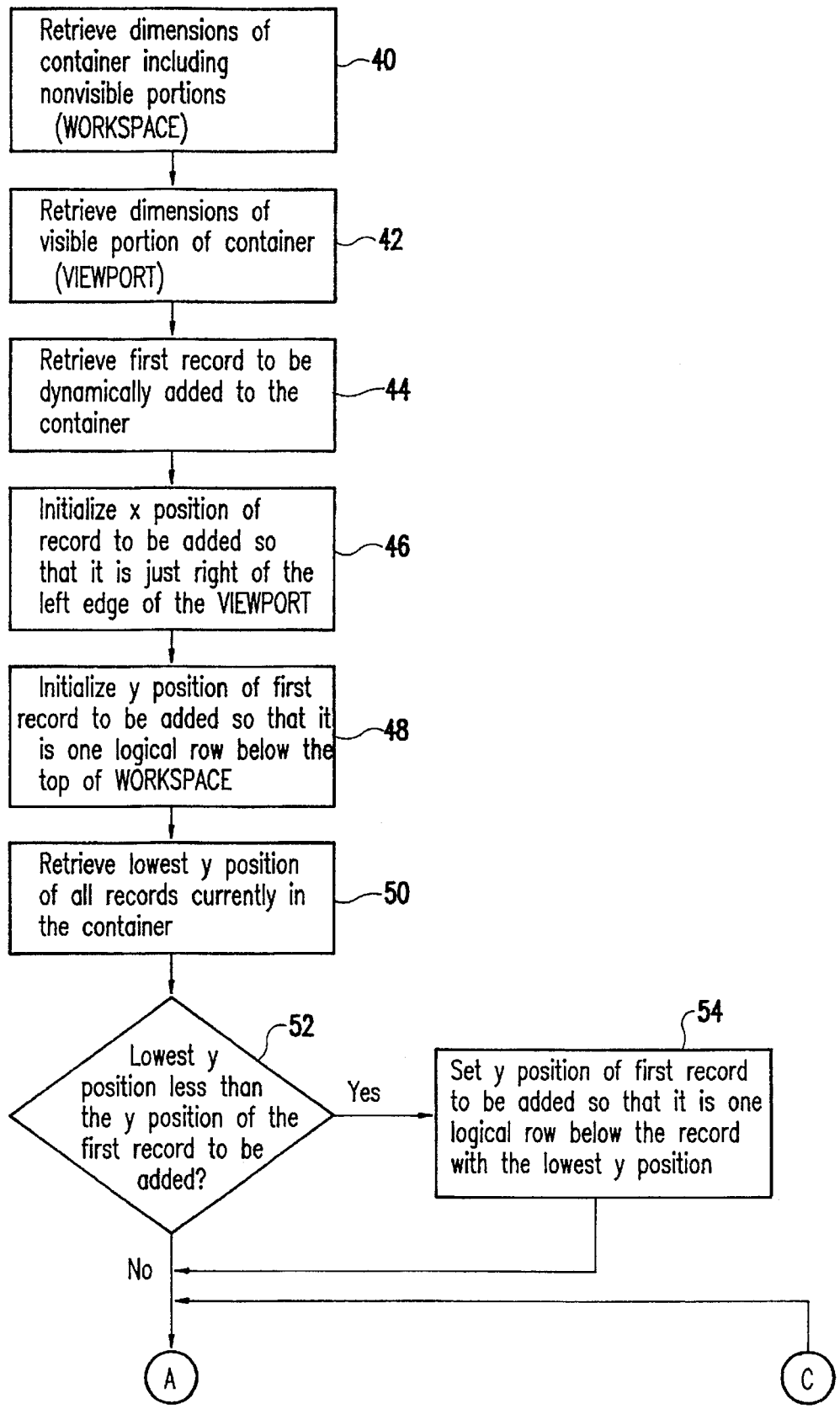
FIGS. 2A and 2B are flow diagrams which provide the logic of icon placement on a screen according to a first embodiment of the invention.
Figure 2B:
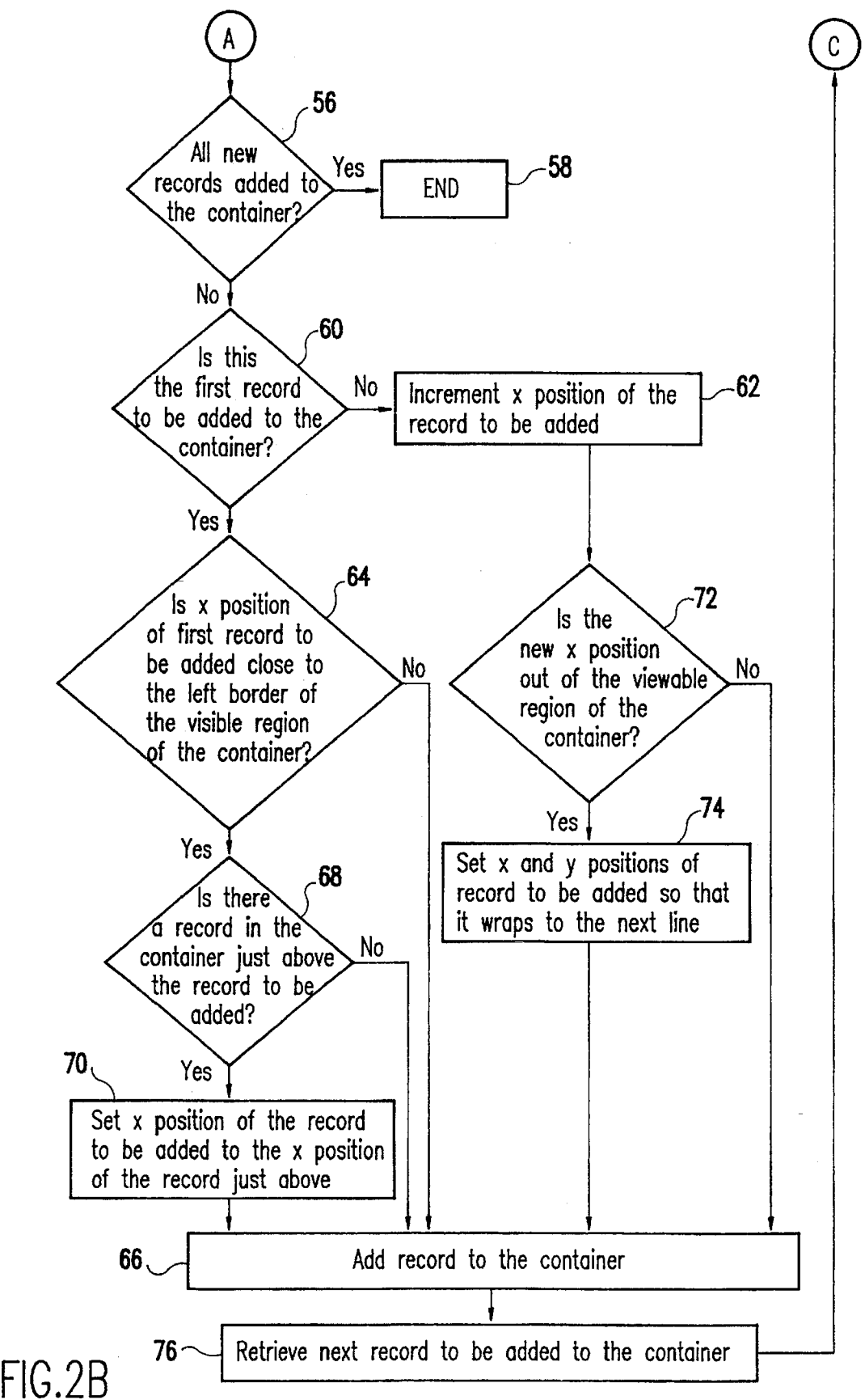

In the first alternative, all container records are added at the bottom of the container after all other records and are fanned out. FIGS. 2A and 2B are flow diagrams which provide the logic for the addition of each record to the container. As shown, first the dimensions of the nonvisible and visible portions of the container are obtained and stored as WORKSPACE in function block 40. Then, the dimensions of the visible portions of the container are retrieved and stored as VIEWPORT in function block 42. The position (s) of all existing record(s) are examined by using the PM CM_QUERYRECORD call. Next, the first record to be added to the container is retrieved in function block 44. At this point, the x position (vertical) is initialized so that it is just to the right of the left edge of VIEWPORT in function block 46, and the y position (horizontal) is initialized to be one logical row below the top of WORKSPACE in function block 48. Next, the lowest y position of all of the records in the container is retrieved in function block 50.

Once this initialization process is complete, a determination is made in decision block 52 as to whether the lowest y position in the container is less than the y position of the first record to be added. If so, the y position of the first record to be added is calculated in function block 54 by using the lowest y position and decrementing it by a fixed amount that corresponds approximately to the size of an icon or, in other words, it is one logical row below the lowest y position. This, in effect, will start the first dynamically added container record in a y position that is equivalent to the next logical row. When the calculation of function block 54 is complete or if the lowest y position is not less than the y position of the record to be added, the process goes to FIG. 2B via connector A where in decision block 56, a determination is made as to whether all new records have been added to the container. If so, the processing terminates at block 58; otherwise, in decision block 60, a determination is made as to whether this is the first record added to the container. Otherwise, the x position of the record to be added is incremented in function block 62. The PM CM_QUERYVIEWPORTRECT message is used in order to determine the coordinates of the viewable region and a fixed constant approximating the width of a container record is added to this amount to obtain the x position. The x position of the next record is increased by a fixed amount plus the addition of one half the length of the text string of the previous record plus one half the length of the text string of the record that is about to be added. The text strings can be calculated using the GpiQueryTextBox Application Programming Interface (API).

A determination is made in decision block 64 as to whether the x position of the first record to be added is close to the left border of the visible region of the container. If not, the record is added to the container in function block 66. If it is close to the left border, then in decision block 68, a determination is made as to whether there is a record in the container just above the record to be added. If not, the record is added to the container in function block 66; otherwise, the x position of the first record to be added is set to the x position of the record just above in function block 70 before the record is added to the container in function block 66.

Proceeding from function block 62 when the x position of a second or subsequent record to be added is incremented, a determination is made in decision block 72 as to whether the x position is out of the viewable region of the container. If not, the record is added to the container in function block 66; otherwise, the x and y positions of the record to be added are set in function block 74 so that the record will be on the next logical row before the record is added to the container in function block 66. Note that the determination of whether a record about to added would be out of the viewable region of a container in decision block 72 is determined by examining the x position to see if it is a set constant amount (equal to about the size of a container record) from the right hand side of the container's viewable region. After function block 66, the next record to be added to the container is retrieved 76, and the process loops following to decision block 52 in FIG. 2A via connector C to complete processing of other records, if any.

According to this process, the records are added so that the x values are incremented for each subsequent record until a value close to the right edge of the container's viewable region is reached, then the y value is decremented and the x value is reset so as to start in the next logical row.

Figure 3:
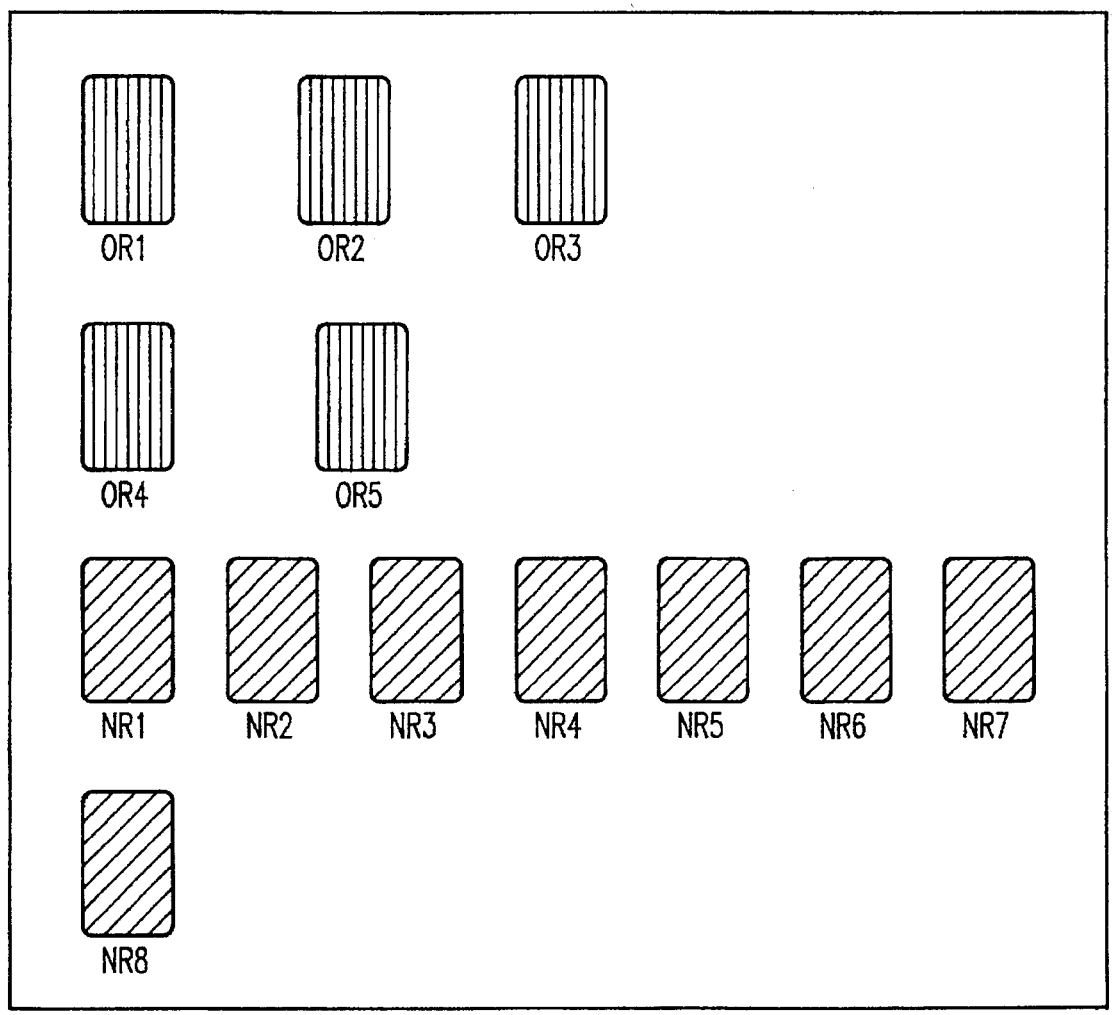
FIG. 3 is a pictorial representation of the screen showing the icon placement according to a first embodiment of the invention.

FIG. 3 is a pictorial representation of a simulation of a display screen showing how new icons are placed. As shown, the ORx are the old records which were on the screen and the NRx records are the new records which were added. As can be seen, all of the new records are added at the bottom of the container and are spread out so that there is no overlap of records.

In the second alternative, all container records are added starting at the top of the visible region of the container and will be added only in available occupied or "white space". The term "white space" is used in the art to mean unoccupied space without regard to the actual color of the display screen background color. For example, if there is enough white space available in the first "row" of container records for a record to fit without overlapping any other records, then that record will be added to that space. The rest of the container is examined in similar manner moving down until all dynamically added records are placed.

Figure 4A:
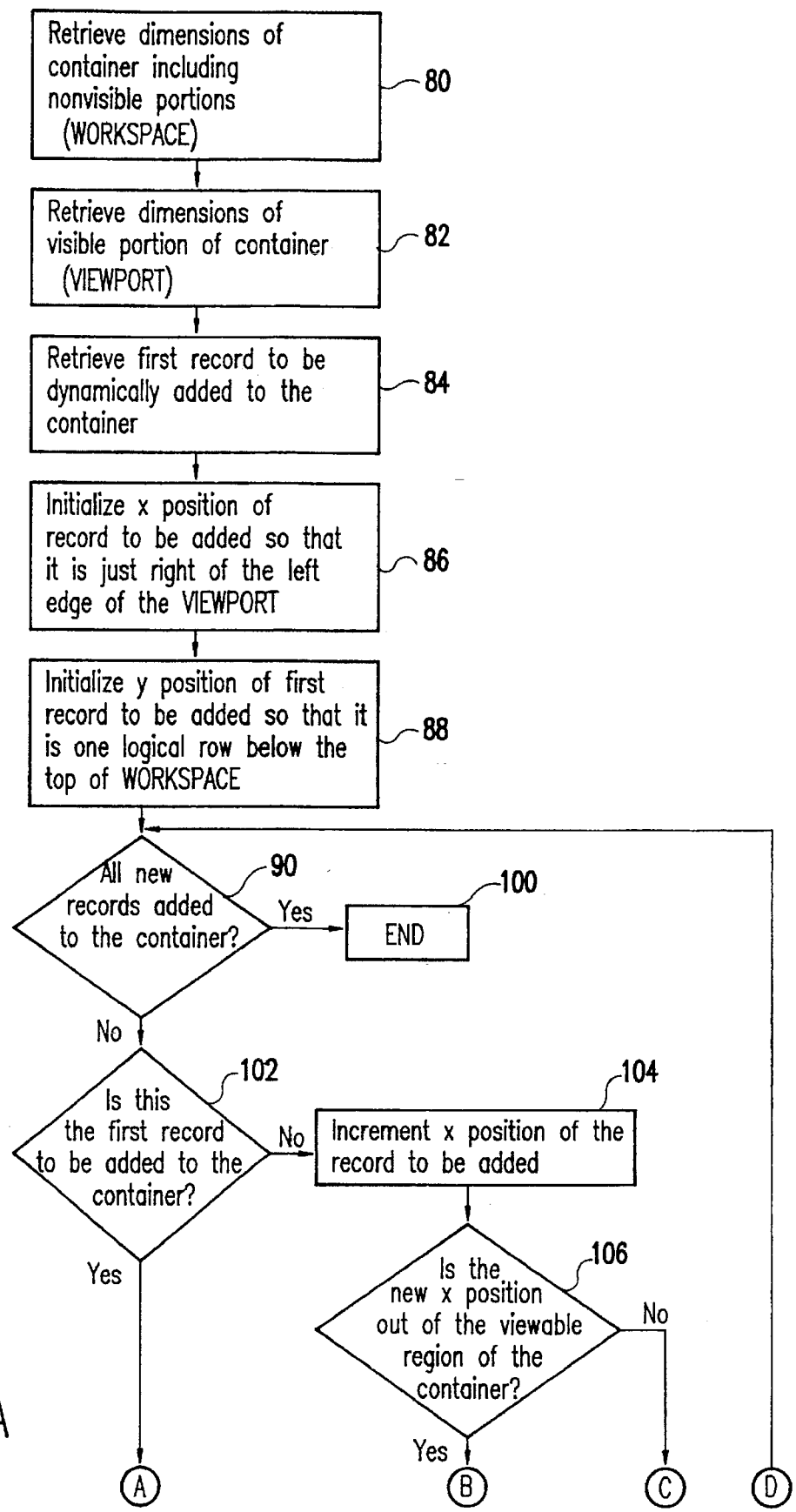
FIGS. 4A and 4B are flow diagrams which provide the logic of icon placement on a screen according to a second embodiment of the invention.
Figure 4B:
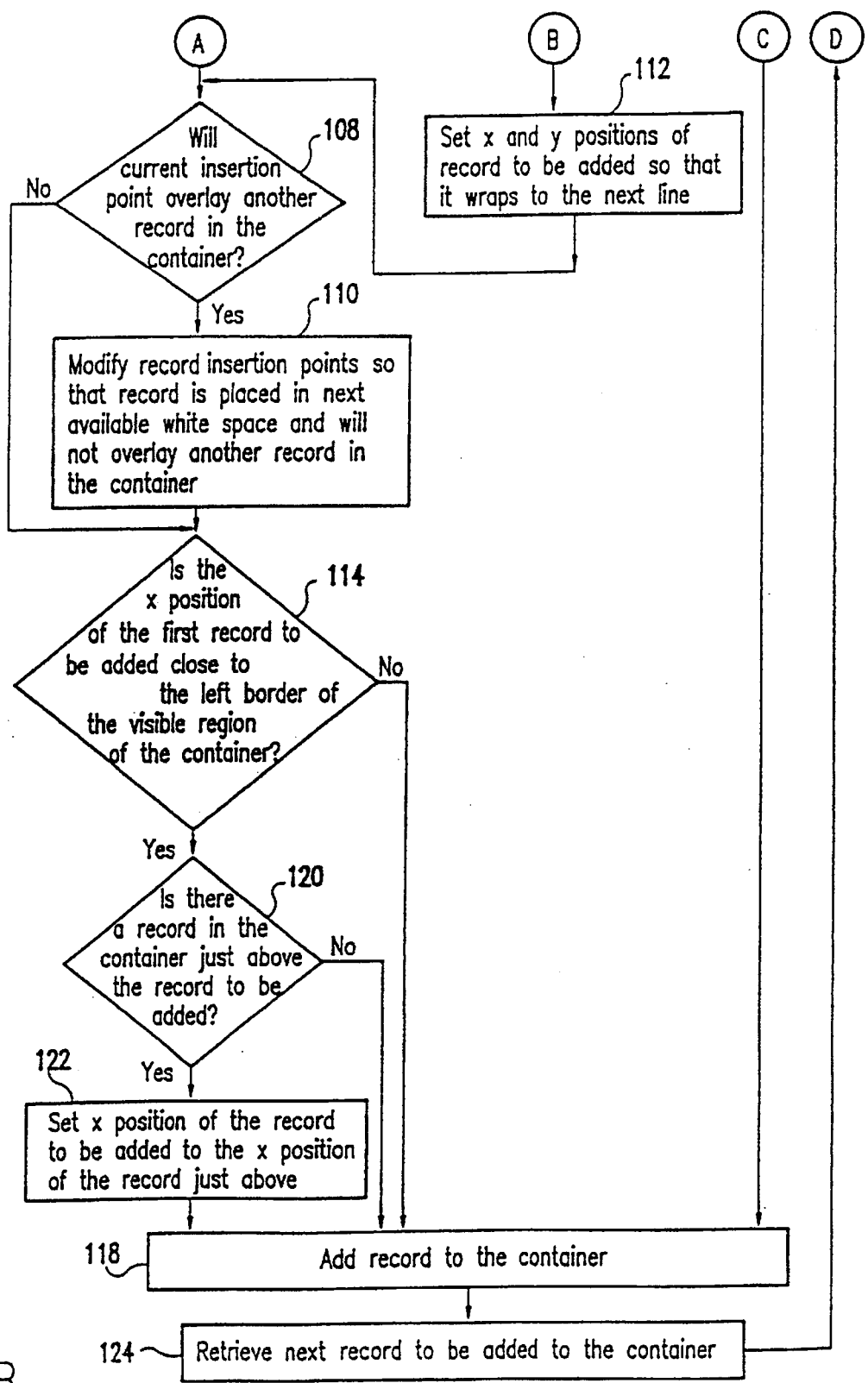

FIGS. 4A and 4B provide the logical flow for the addition of records according to the second embodiment of the invention. The process begins by obtaining the dimensions of the nonvisible and visible portions of the container and storing them as WORKSPACE in function block 80. Then, the dimensions of the visible portions of the container are retrieved and stored as VIEWPORT in function block 82. The position(s) of all existing record(s) are examined by using the PM CM_QUERYRECORD call. Next, the first record to be added to the container is retrieved in function block 84. At this point, the x position (vertical) is initialized so that it is just to the right of the left edge of VIEWPORT in function block 86, and the y position (horizontal) is initialized to be one logical row below the top of WORKSPACE in function block 88. The PM CM_QUERYVIEWPORTRECT message is used to obtain the base coordinates used to calculate the starting placement point of the record that is about to be added to the container. The placement point is set to be in the upper left hand corner of the visible region.

At this point, the initialization process is complete. In decision block 90, a determination is made as to whether all new records have been added to the container. If so, the processing terminates at block 100; otherwise, a further test is made in decision block 102 to determine whether this is the first record added to the container. If so, control passes to block 108 in FIG. 4B via connector A. If not, the x position of the record to be added is incremented in function block 104. It should be noted that a more detailed description of the incrementation of the x position is provided in the discussion of FIGS. 2A and 2B, supra. At this point, a determination is made in decision block 106 as to whether the new x position is out of the viewable region of the container. If so, the process goes to FIG. 4B via connector B, but if not, the process goes to FIG. 4B via connector C.

Entering FIG. 4B via connector A from a determination in decision block 102 that this is the first record to be added to the container, a test is made in decision block 108 to determine whether the current insertion point will overlay another record in the container. If so, the record insertion point is modified in function block 110 so that the record is placed in the next available white space and will not overlay another record in the container. Then, control passes to decision block 114. If the current insertion point will not overlay another record in the container, control passes directly to decision block 114.

The process of modifying the insertion point in function block 110 is accomplished with the following routine. All existing container records are examined using the PM CM_QUERYRECORD message to determine if a conflict exists. A conflict is defined as being within a certain x and y range equivalent to the size of a container record plus a small margin. The size of the icon text of both the record about to be added and the record being checked in the container are also taken into account. The PM GpiQueryTextBox API allows this information to be obtained. While there is a conflict, the x position of the insertion point is modified by a fixed amount equivalent to a container record's width plus a little margin. Then a check is made to see if the new position will exceed the viewable region of the container and if so wrap to the next logical row by resetting the x and y position by fixed amounts. If it is not necessary to wrap to the next line, the y position of the insertion point is matched with the y position of the last record that was in conflict with the insertion point. This will insure that the record that is about to be added will line up horizontally. A check is again made to see if there is still a conflict.

Entering FIG. 4B via connector B from decision block 106 when the new x position of the record is out of the viewable region of the container, the x and y positions of the record to be added are adjusted so that the record will be placed on the next logical row in function block 112. The x position is again set a little to the right of the left hand side of the viewable region as described above. The y position is set by decrementing it a fixed amount (again about the size of a container record). After the x and y positions are set in function block 112, control passes to decision block 108 where it is determined whether the current insertion will overlay an existing record in the container.

After the modification of the position in function block 110 or if there was no overlay, a determination is made in decision block 114 as to whether the x position of the insertion point is close to the left border of the visible region of the container (i.e., a check is made of a defined constant equivalent to the size of a container record plus a small margin). If not, the record is added to the container in function block 118. If so, then a determination is made in decision block 120 as to whether there is a record in the row above the record to be added. If not, the record is added to the container in function block 118, but if so, the x position of the record to be added is changed to match the x position of the record above in function block 122. Therefore, the record to be added will line up vertically. Then, the record is added to the container in function block 118. The third entry to FIG. 4B is via connector C from decision block 106 where, if the new x position is not out of the viewable region of the container, the record is simply added to the container in function block 118. The PM CM_INSERTRECORD message is sent to the container in order to actually add the record to the container. Subsequent records use the position of the last added record and follow the same process as described above. Finally, the next record to be added is retrieved in function block 124, and the process loops back via connector D to decision block 90 to continue processing other records, if any.

Figure 5:
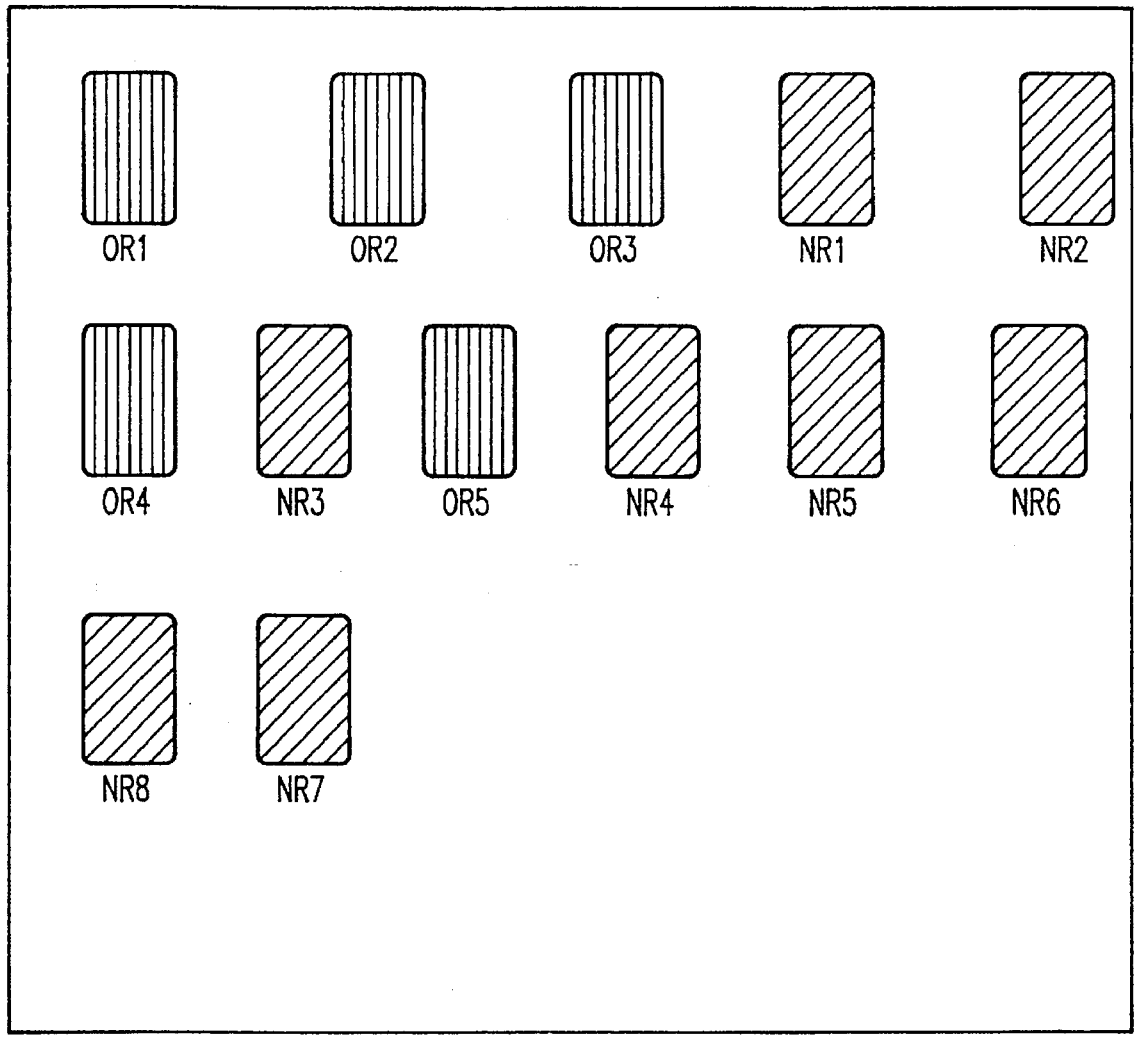
FIG. 5 is a pictorial representation of the screen showing the icon placement according to a second embodiment of the invention.

As shown in FIG. 5, new container records are added starting at the top of the visible region and will be added in any open white space.

Figure 6:
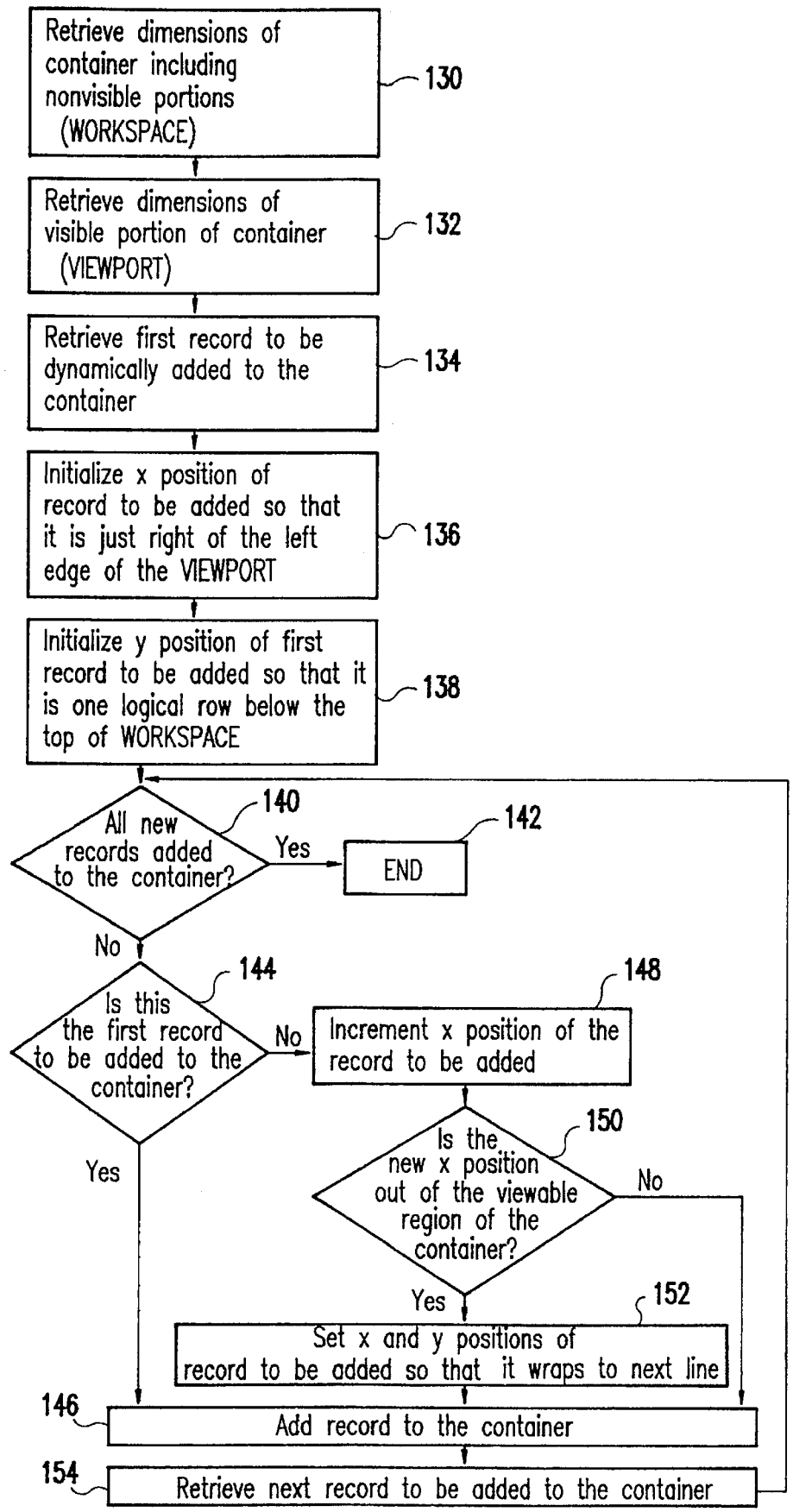
FIGS. 6 is a flow diagram which provides the logic of icon placement on a screen according to a third embodiment of the invention.

In the third alternative, all container records are added starting at the top of the visible region of the container and are fanned out without regard to whether any records exist underneath the added records. FIG. 6 is a flow diagram of the logic for the addition of records according to this embodiment of the invention. As shown, the dimensions of the nonvisible and visible portions of the container are obtained and stored as WORKSPACE in function block 130. Then, the dimensions of the visible portions of the container are retrieved stored as VIEWPORT in function block 132. Next, the first record to be added to the container is retrieved in function block 134. At this point, the x position (vertical) is initialized so that it is just to the right of the left edge of VIEWPORT in function block 136, and the y position (horizontal) is initialized to be one logical row below the top of WORKSPACE in function block 138 to complete the initialization phase of the process. The PM CM_QUERYVIEWPORTRECT message is used to obtain the base coordinates used to calculate the starting placement point of the record that is about to be added to the container. The placement point is set to be in the upper left hand corner of the visible region.

At this point, a determination is made in decision block 140 as to whether all new records have been added to the container. If so, the processing terminates at block 142; otherwise, a further test is made in decision block 144 to determine whether this is the first record added to the container. If so, the record is added to the container 146. If not, the x position of the record to be added is incremented in function block 148. It should be noted that a more detailed description of the incrementation of the x position is provided in the discussion of FIGS. 2A and 2B, supra. Next, a determination is made in decision block 150 as to whether the new x position is out of the viewable region of the container. If not, then the record is added to the container in function block 146. If so, then the x and y positions are adjusted so that the record will be on the next logical row in function block 152 before adding the record to the container in function block 146. The x position of the next record about to be added is incremented in function block 148 based on the x position of the last record added plus a fixed constant, and also the PM GpiQueryTextBox API is used to take into account the length of the icon text of the previously added record and the length of the icon text of the record that is about to be added. Finally, the next record to be added is retrieved in function block 154, and the process loops back to decision block 140 to continue processing other records, if any.

Figure 7:
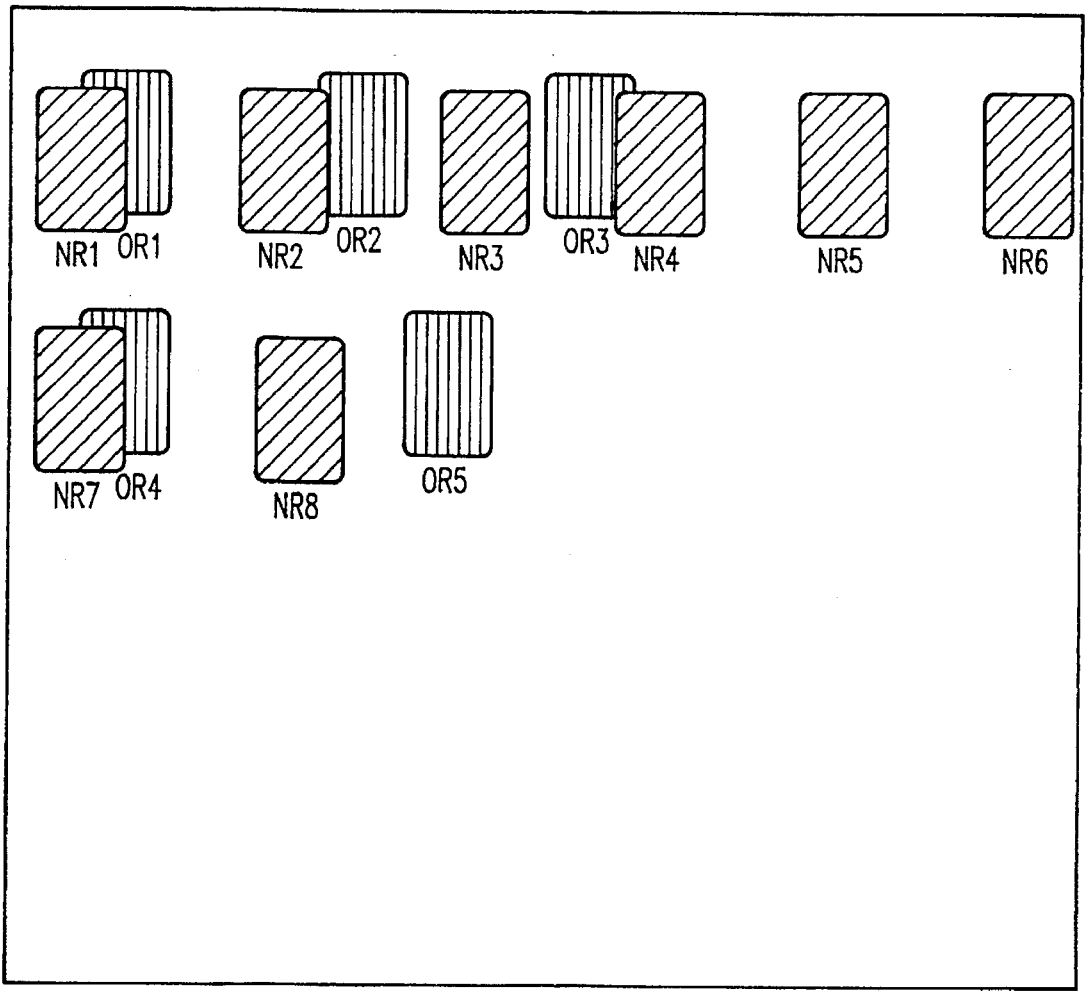
FIG. 7 is a pictorial representation of the screen showing the icon placement according to a third embodiment of the invention.

As shown in FIG. 7, in the third embodiment, the container records are added starting at the top of the visible region of the container and are fanned out without regard to whether any records exist underneath the newly added records.

Figure 8:
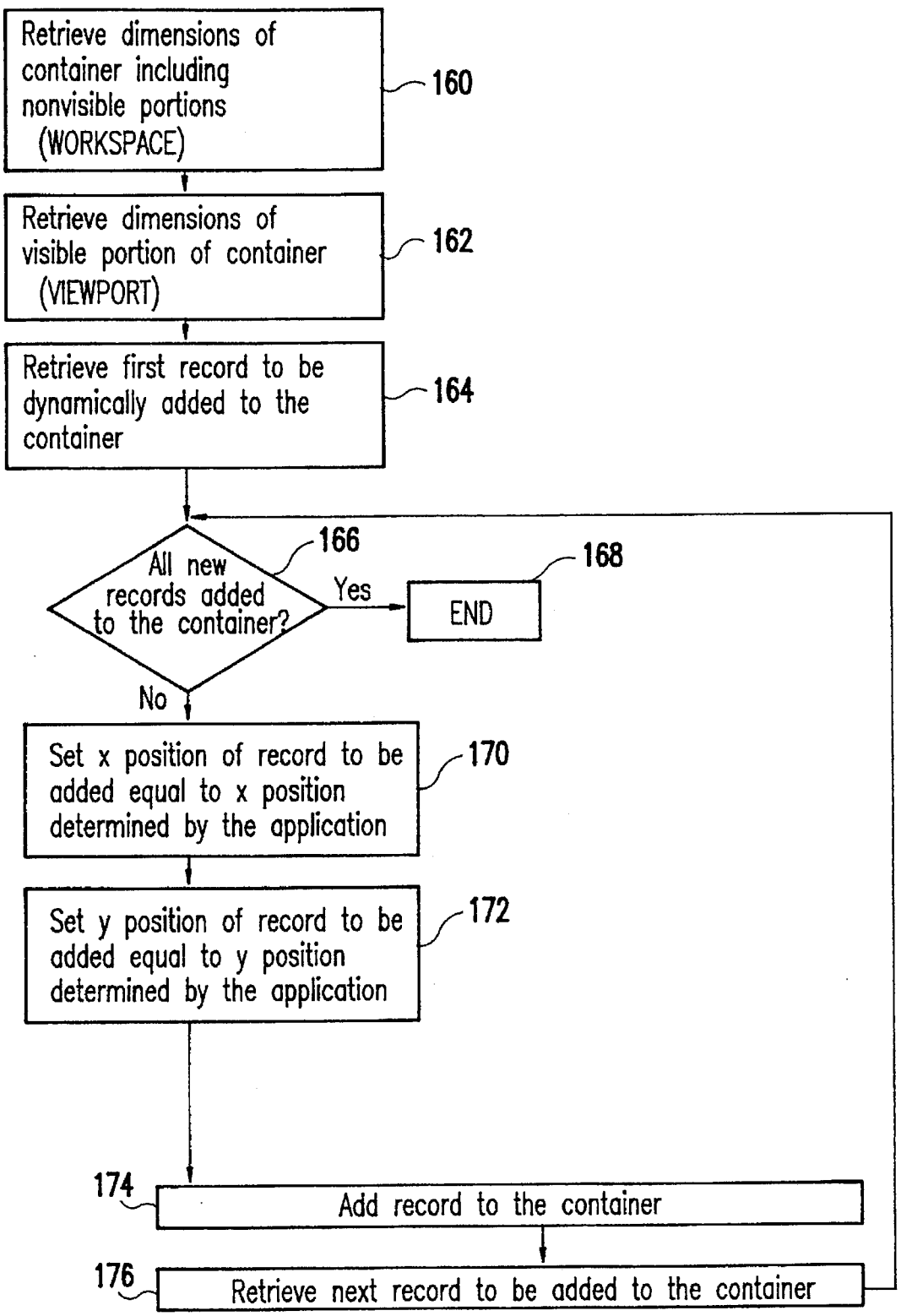
FIG. 8 is a flow diagram which provides the logic of icon placement on a screen according to a fourth embodiment of the invention.

FIG. 8 provides a flow diagram for the fourth alternative wherein all container records are added using the position information as determined by the application. In the fourth embodiment, first the dimensions of the entire container including the nonvisible portions are retrieved and stored as the WORKSPACE in function block 160. Then, the visible portions of the container are obtained as VIEWPORT in function block 162. Next, the first record to be dynamically added to the container is retrieved in function block 164, completing the initialization phase of the process.

A determination is then made in decision block 166 as to whether all new records have been added to the container. If so, the process ends at block 168; otherwise, the x position of the record to be added is set to the x position determined by the application program in function block 170, and the y position of the record to be added is set equal to the y position determined by the application program in function block 172. At this point, the record is added to the container in function block 174. The next record to be added to the container is retrieved in function block 176, and the process loops back to decision block 166 to continue processing other records, if any.

Figure 9:
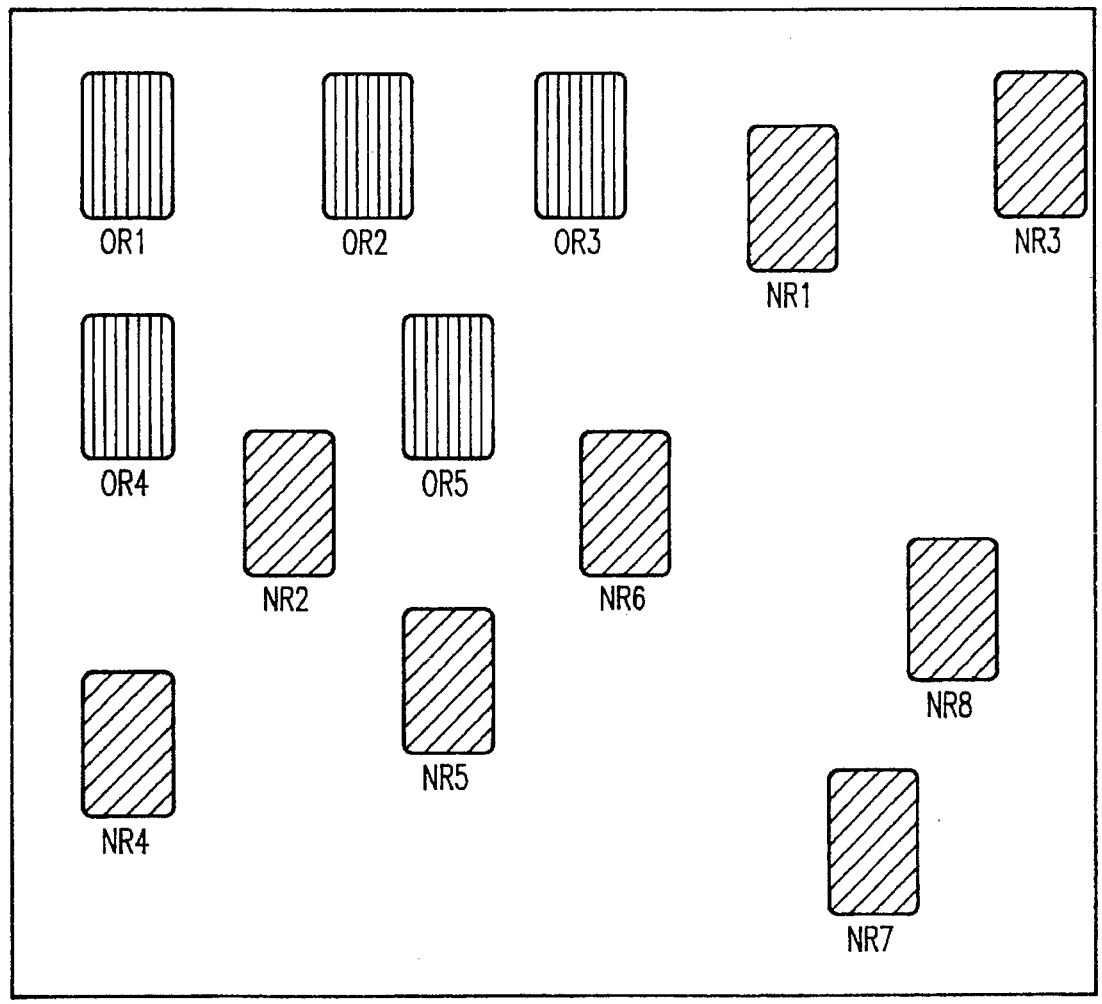
FIG. 9 is a pictorial representation of the screen showing the icon placement according to a fourth embodiment of the invention.

FIG. 9 provides an example of how the records would be added using position information provided by the application program according to the fourth alternative.

Figure 10:
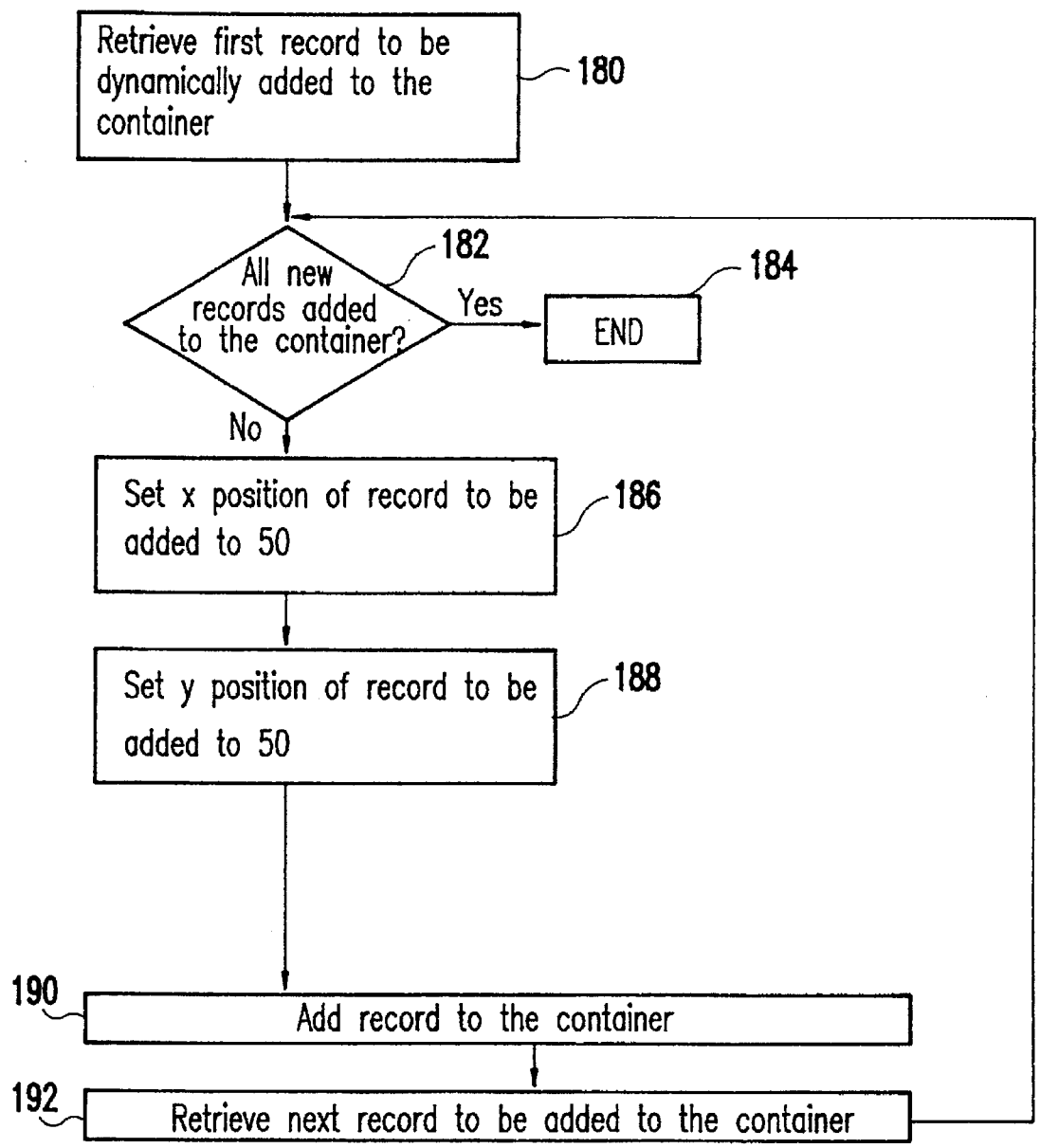
FIGS. 10 is a flow diagram which provides the logic of icon placement on a screen according to a fifth embodiment of the invention.

In the fifth alternative, all container records are added in the bottom left corner of the container. An example location would be to set both the x and y positions to 50. As illustrated in FIG. 10, the process begins by retrieving the first record to be added in function block 180. Then, a test is made in decision block 182 to determine whether all records have been added to the container. If so, the processing terminates at block 184; otherwise, the x position of the record to be added is set to 50 in function block 186, and the y position of the record to be added is set to 50 in function block 188. The coordinates 50,50 in this example correspond to a predetermined position towards the bottom left corner of the container. Then, the record is added to the container in function block 190 before the next record to be added is retrieved in function block 192. The process then loops back to decision block 182 and continues until all records have been processed.

Figure 11:
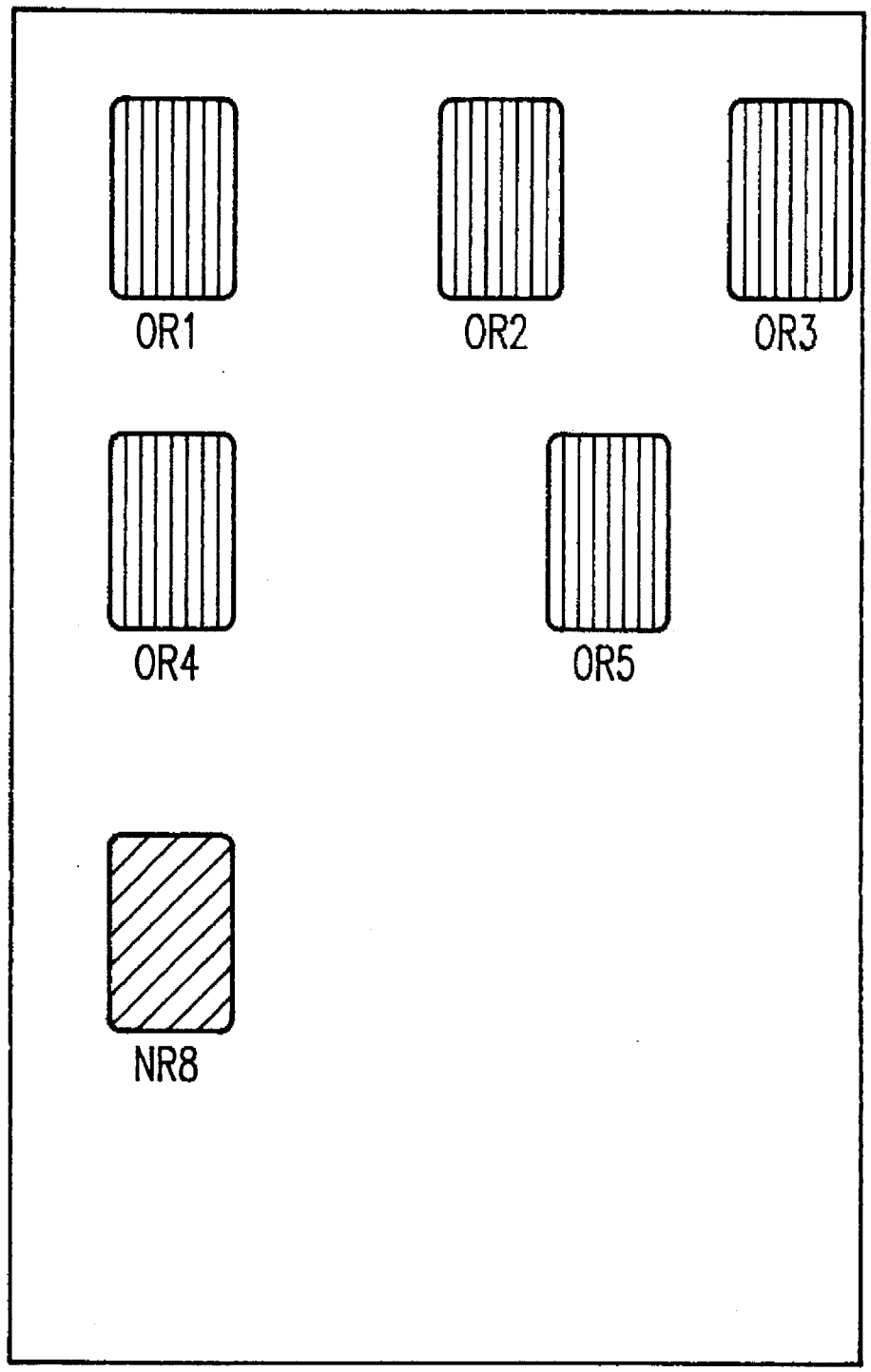
FIG. 11 is a pictorial representation of the screen showing the icon placement according to a fifth embodiment of the invention.

As shown in FIG. 11, it appears that only record NR8 has been added. However, since all of the records are added at the same position, the records will be stacked on top of each other. Therefore, only the new record which is added last will be visible, in this case NR8.

While the invention has been described in terms of a single preferred embodiment providing several alternatives to the application programmer, those skilled in the art will recognize that the invention can be practiced with modification within the spirit and scope of the appended claims.

Having thus described our invention, what we claim as new and desire to secure by Letters Patent is as follows:

1. A method implemented in a graphical user interface environment on a computer for dynamically adding icons to a display screen of the computer by an application program in the course of running the application program, said method comprising the steps of:
   providing alternative choices for procedures to dynamically add and position icons on the display screen;
   selecting by the application program one of the alternative choices for the placement of dynamically added icons, the selection by the application program being based on particular circumstances as determined by an application programmer of the application program; and
   placing an icon on the display screen according to a procedure corresponding to a selected one of the alternate choices for the placement of dynamically added icons.

2. The method according to claim 1 wherein icons dynamically added to the display screen graphically represent container records which represent objects.

3. The method according to claim 2 wherein one of the alternative choices for the placement of dynamically added icons comprises adding records to a container incrementing x values of placement locations for each subsequent record after a first record until a value close to a right edge of a viewable region of the container is reached, then decrementing y values of placement locations, resetting the x value each time a y value is decremented so as to start in a next logical row, whereby all container records are added at the bottom of the container after all other records and are fanned out.

4. The method according to claim 2 wherein one of the alternative choices for the placement of dynamically added icons comprises adding new container records starting at the top of a visible region in any unoccupied space.

5. The method according to claim 2 wherein one of the alternative choices for the placement of dynamically added icons comprises adding new container records starting at the top of a visible region of the container and fanning out added icons without regard to whether any records exist underneath newly added records.

6. The method according to claim 2 wherein one of the alternative choices for the placement of dynamically added icons comprises adding new records using position information provided by the application program.

7. The method according to claim 2 wherein one of the alternative choices for the placement of dynamically added icons comprises adding all new records at the same position, with subsequently added records being stacked on top of previously added records so that only a last added new record is visible.

8. The method according to claim 2 wherein the alternative choices for the placement of dynamically added icons comprise:

adding records to a container incrementing x values of placement locations for each subsequent record after a first record until a value close to a right edge of a viewable region of the container is reached, then decrementing y values of placement locations, resetting the x value each time a y value is decremented so as to start in a next logical row, whereby all container records are added at the bottom of the container after all other records and are fanned out;

adding new container records starting at the top of a visible region in any unoccupied space;

adding new container records starting at the top of the visible region of the container and fanning out added icons without regard to whether any records exist underneath newly added records;

adding new records using position information provided by the application program; and adding all new records at the same position, with subsequently added records being stacked on top of previously added records so that only a last added new record is visible.

9. An apparatus using a graphical user interface environment on a computer for dynamically adding icons to a display screen of the computer by an application program in the course of running the application program, said apparatus comprising:

means for providing alternative choices for procedures to dynamically add and position icons on the display screen;

means for selecting by the application program one of the alternative choices for the placement of dynamically added icons, the selection by the application program being based on particular circumstances as determined by an application programmer of the application program; and means for placing an icon on the display screen according to a procedure corresponding to a selected one of the alternate choices for the placement of dynamically added icons.

10. The apparatus according to claim 9 wherein icons dynamically added to the display screen graphically represent container records which represent objects.

11. The apparatus according to claim 10 wherein a position of a dynamically added icon is defined by x, y coordinates on the display screen, and wherein said means for placing an icon on the display screen adds records to a container incrementing x values of placement locations for each subsequent record after a first record until a value close to a right edge of a viewable region of the container is reached, then decrementing y values of placement locations, resetting the x value each time a y value is decremented so as to start in a next logical row, whereby all container records are added at the bottom of the container after all other records and are fanned out.

12. The apparatus according to claim 10 wherein said means for placing an icon on the display screen adds new container records starting at the top of a visible region in any unoccupied space.

13. The apparatus according to claim 10 wherein said means for placing an icon on the display screen adds new container records starting at the top of a visible region of the container and fanning out added icons without regard to whether any records exist underneath newly added records.

14. The apparatus according to claim 10 wherein said means for placing an icon on the display screen adds new records using position information provided by the application program.

15. The apparatus according to claim 10 wherein said means for placing an icon on the display screen adds all new records at the same position, with subsequently added records being stacked on top of previously added records so that only a last added new record is visible.

16. The apparatus according to claim 10 wherein said means for placing an icon on the display screen alternatively:

adds records to a container incrementing x values of placement locations for each subsequent record after a first record until a value close to a right edge of a viewable region of the container is reached, then decrementing y values of placement locations, resetting the x value each time a y value is decremented so as to start in a next logical row, whereby all container records are added at the bottom of the container after all other records and are fanned out;

adds new container records starting at the top of the visible region in any unoccupied space;

adds new container records starting at a top of a visible region of the container and fanning out added icons without regard to whether any records exist underneath newly added records;

adds new records using position information provided by the application program; and adds all new records at the same position, with subsequently added records being stacked on top of previously added records so that only a last added new record is visible.

* * * * *